US009435910B2

(12) United States Patent
Hsu

(10) Patent No.: US 9,435,910 B2

(45) Date of Patent: Sep. 6, 2016

(54) LIGHT SENSING DEVICE FOR DETECTING GESTURES HAVING A CASING WITH A LENS RECEIVING APERTURE DISPOSED IMMEDIATELY ADJACENT TO A DISPLAY SCREEN

(71) Applicant: Maxim Integrated Products, Inc., San Jose, CA (US)

(72) Inventor: Sunny K. Hsu, Los Altos, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 200 days.

(21) Appl. No.: 13/675,045

(22) Filed: Nov. 13, 2012

(65) Prior Publication Data

US 2013/0134303 A1 May 30, 2013

Related U.S. Application Data

(60) Provisional application No. 61/564,341, filed on Nov. 29, 2011.

(51) Int. Cl.

| | |
|---|---|
| ***G01J 1/04*** | (2006.01) |
| ***G01V 8/10*** | (2006.01) |
| ***G06F 3/042*** | (2006.01) |
| ***G06F 3/0488*** | (2013.01) |

(52) U.S. Cl.

CPC ................ *G01V 8/10* (2013.01); *G06F 3/042* (2013.01); *G06F 3/04883* (2013.01); *G06F 2203/04103* (2013.01); *G06F 2203/04108* (2013.01)

(58) Field of Classification Search

CPC ...... H03K 17/78; H04N 5/2254; G01V 8/20; G01V 8/12; G01S 17/026; G01S 7/034; G01S 17/74; G01S 5/16; G01S 7/481; F16P 3/14; G06F 3/0488; G06F 3/04883; G06F 3/04886; G06F 3/0421; G06F 3/0412; G06F 3/042; G02B 7/02; G02B 7/022; G02B 7/025; H01L 27/14618; H01L 31/0203; H01L 31/0232; H01L 31/02325; H01L 31/02327; G01L 27/14625; H04B 1/38; H04B 10/00; H04B 10/40; G01J 1/04; G01J 1/0422; G01J 1/06; G01J 5/0806

USPC ................ 250/551, 239, 214.1, 221, 237 R; 257/80–85; 359/355, 808, 809, 811, 359/815, 819; 455/78, 81, 90.3; 398/115–117, 130, 138, 168–170, 172; 345/173, 175, 176

See application file for complete search history.

(56) References Cited

U.S. PATENT DOCUMENTS

| | | | | |
|---|---|---|---|---|
| 8,008,613 | B2 * | 8/2011 | Tam | 250/226 |
| 2009/0250598 | A1 * | 10/2009 | Hamada et al. | 250/227.11 |

(Continued)

FOREIGN PATENT DOCUMENTS

| | | | |
|---|---|---|---|
| CN | 1168341 | C | 9/2004 |
| CN | 1276338 | C | 9/2006 |
| CN | 101936752 | A | 1/2011 |

OTHER PUBLICATIONS

Chinese Official Action dated Nov. 3, 2015 for Chinese Application No. 201210499836.1.

*Primary Examiner* — Que T Le

(74) *Attorney, Agent, or Firm* — Advent, LLP

(57) ABSTRACT

Light sensing devices are described that have a lens to focus light. In one or more implementations, the light sensing devices include a substrate having a photodetector formed thereon. The photodetector is capable of detecting light and providing a signal in response thereto. The devices also include a display screen that allows light to at least substantially pass through the display screen. An optical baffle extends above a surface of the substrate to display screen and is configured to at least substantially prevent transmission of optical crosstalk to the photodetector. The devices also include a lens disposed proximate to the display screen. The lens is configured to focus light incident upon the lens and to pass the focused light to the photodetector.

12 Claims, 2 Drawing Sheets

100 122 106 120 108 102 118 122 116 110 104 112 114

(56) References Cited

U.S. PATENT DOCUMENTS

2011/0058088 A1* 3/2011 Hsu et al. .................... 348/335
2011/0133941 A1* 6/2011 Yao et al. .................... 340/600
2011/0181506 A1 7/2011 Lee
2011/0229119 A1* 9/2011 Liang ........................... 396/535
2012/0133956 A1* 5/2012 Findlay et al. ............... 356/614

* cited by examiner 100
112
120
116
114
118
110
106
108
104
102

100
112
116
114
124
123
120
118
110
126
106
108
104
102

LIGHT SENSING DEVICE FOR DETECTING GESTURES HAVING A CASING WITH A LENS RECEIVING APERTURE DISPOSED IMMEDIATELY ADJACENT TO A DISPLAY SCREEN

CROSS-REFERENCE TO RELATED APPLICATIONS

The present application claims the benefit under 35 U.S.C. §119(e) of U.S. Provisional Application Ser. No. 61/564,341, entitled LIGHT SENSING DEVICE HAVING A LENS, filed on Nov. 29, 2011. U.S. Provisional Application Ser. No. 61/564,341 is herein incorporated by reference in their entireties.

BACKGROUND

Electronic devices, such as smart phones, tablet devices, laptop and desk top computers, digital media players, and so forth, increasingly employ light sensors to control the manipulation of a variety of functions provided by the device. For example, light sensors are commonly used by electronic devices to detect ambient lighting conditions in order to control the brightness of the device's display screen and the keyboard. Typical light sensors employ photodetectors such as photodiodes, phototransistors, or the like, which convert received light into an electrical signal (e.g., a current or voltage, analog or digital).

Light sensing devices are commonly used in gesture or proximity sensing devices. Gesture sensing devices enable the detection of physical movement largely parallel to the display surface (e.g., "gestures") without the user actually touching the device within which the gesture sensing device resides. Proximity sensing devices enable the detection of physical movement that is largely perpendicular to the display surface (e.g., proximate to the display surface). The detected movements can be subsequently used as input command for the device. In implementations, the electronic device is programmed to recognize distinct non-contact hand motions, such as left-to-right, right-to-left, up-to-down, down-to-up, in-to-out, out-to-in, and so forth. Gesture and proximity sensing devices have found popular use in handheld electronic devices such as tablet computing devices and smart phones, as well as other portable electronic devices such as laptop computers, video game consoles, and so forth.

SUMMARY

Light sensing devices are described that have a lens to focus light. In one or more implementations, the light sensing devices include a substrate having a photodetector formed thereon. The photodetector is capable of detecting light and providing a signal in response thereto. The devices also include a display screen that allows light to at least substantially pass through the display screen. An optical baffle extends above a surface of the substrate to display screen and is configured to at least substantially prevent transmission of optical crosstalk to the photodetector. The devices also include a lens disposed proximate to the display screen. The lens is configured to focus light incident upon the lens and to pass the focused light to the photodetector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Figure 2:
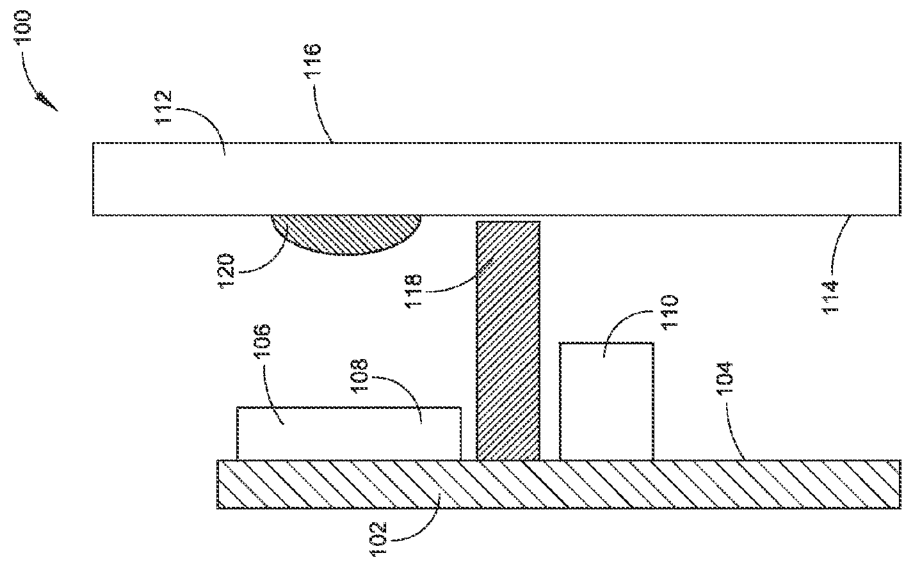
FIG. 2 is a diagrammatic partial cross-sectional view illustrating a light sensing device in accordance with another example implementation of the present disclosure, where the lens is disposed over an interior surface of the display screen and positioned over the photodetector.

Gesture or proximity sensing devices typically include light sensing devices to allow for detection of physical movement in proximity to the devices. These light sensing devices are configured to detect light that is generated from an illumination source and reflected from an object, such as a finger or a hand, in proximity to the sensor. To collect more light to enhance the signal, light sensing devices may include a lens formed directly on top of a photodetector. However, for reason of cost and manufacturability, the acceptable lens dimension may be limited by the photodetector, which may require a high power (short focal length) lens, which increase the cost and reduce the signal amplitude of the detector. As the amplitude of the detector is reduced, the illumination source may require a greater amount of current to generate a light signal sufficiently above noise to be detected by the photodetector. Correspondingly, the greater amount of current required by the illumination source drains the battery power source of the light sensing device.

Accordingly, light sensing devices are described that have a lens disposed (e.g., formed, positioned, etc.) proximate to a display screen of the devices. By positioning the lens proximate to the display screen, the lens dimensions may not be limited by the photodetector. For example, a lower power (longer focal length) lens can be used. Thus, the battery power requirements of the illumination source may also be reduced. In one or more implementations, the light sensing devices include a substrate having a photodetector formed thereon. The light sensing devices may, in some implementations, further include an illumination source that is configured to generate light. In a specific implementation, the light sensing devices may include a single illumination source. The photodetector is capable of detecting light emitted from the illumination source and providing a signal in response thereto. In another specific implementation, the photodetector may be configured as a quad segmented photodetector. The light sensing devices also include a display screen that allows illuminating light and reflected light to at least substantially pass through the display screen. An optical baffle is disposed between the illumination source and the photodetector to at least substantially prevent optical crosstalk between the illumination source and the photodetector. The sensors also include a lens disposed proximate to the display screen. The lens is configured to focus light incident upon the lens and to pass the focused light to the photodetector.

In the following discussion, example implementations of light sensing devices having a lens are described.

Example Implementations

FIGS. 1 through 4 illustrate light sensing device 100 in accordance with an example implementation of the present disclosure. As shown, the light sensing device 100 includes a substrate 102 for providing support to one or more electronic components. The substrate 102 is also configured to provide connective functionality between the various electronic components of the light sensing device 100. For example, the substrate may comprise a printed circuit board (PCB), a flexible circuit harness, or the like. Thus, the substrate 102 may provide support to multiple electronic components, such as digital integrated circuits, analog integrated circuits, or combinations thereof.

The substrate 102 of each light sensing device 100 is illustrated as having a surface 104. A photodetector 106 (e.g., a light sensor) is disposed over the surface 104 of the substrate 102. The photodetector 106 is comprised of a semiconductor substrate 108 that furnishes a base material utilized to form one or more electronic devices through various fabrication techniques such as photolithography, ion implantation, deposition, etching, and so forth. The semiconductor substrate 108 may comprise n-type silicon (e.g., a silicon doped with a group carrier element, such as a group V element [e.g., phosphorus, arsenic, antimony, etc.], to furnish n-type charge carrier elements to the silicon) or p-type silicon (e.g., silicon doped with a group carrier element, such as a group IIIA element [e.g., boron, etc.], to furnish p-type charge carrier elements to the silicon, or other group elements to furnish p-type charge carrier elements). While a silicon substrate is described, it is understood that other types of substrates may be utilized without departing from the scope of this disclosure. For example, the semiconductor substrate 108 may be comprised of silicon-germanium, gallium-arsenide, or the like.

The photodetector 106 may be configured in a variety of ways. For example, the photodetector 106 may comprise a photo sensor diode, a phototransistor, or the like. In an implementation, the photodetector 106 is capable of detecting light and providing a signal in response thereto. The photodetector 106 may provide a signal by converting light into current or voltage based upon the intensity of the detected light. Thus, once a photodetector is exposed to light, multiple free electrons may be generated to create current. The photodetector 106 is configured to detect light in both the visible light spectrum and the near infrared light spectrum. As used herein, the term "light" is contemplated to encompass electromagnetic radiation occurring in the visible light spectrum and the near infrared light spectrum. The visible light spectrum (visible light) includes electromagnetic radiation occurring in the range of wavelengths from approximately three hundred and ninety (390) nanometers to approximately seven hundred and fifty (750) nanometers. Similarly, the near infrared light spectrum (infrared light) includes electromagnetic radiation that ranges in wavelength from approximately seven hundred (700) nanometers to approximately three (3) microns. In one or more implementations, complimentary metal-oxide-semiconductor (CMOS) fabrication techniques may be utilized to form the photodetector 106.

As described above, the photodetector 106 is configured to detect a light and provide a signal in response thereto. In one or more implementations, the light sensing device 100 may be configured for use as or in a gesture or proximity sensing device (e.g., a device that detects when an object, such as a hand or a finger, is brought in proximity to the device 100). In such implementations, the photodetector 106 detects light reflected from an object (e.g., hand or finger) when the object is proximate to the device 100.

The light sensing device 100 also includes an illumination source 110 that is configured to generate light (e.g., near infrared light or visible light). Thus, the light detected (e.g., the light that is reflected from an object proximate to the light sensing device 100) by the photodetector 106 is the light generated and emitted from the illumination source 110. Thus, the photodetector 106 is configured to detect light in a specific wavelength or wavelengths of light. For example, the illumination source 110 may generate a light occurring in a first spectrum of wavelengths. The photodetector 106 may configured to detect light only occurring within the first spectrum of wavelengths. In one or more implementations, the illumination source 110 may be a single light emitting diode, a single laser diode, or another type of light source.

In an implementation, the photodetector 106 may be configured as a segmented photodetector 106. The segmented photodetector 106 can be either a single detector functionally partitioned into multiple segments or an array of individual photodetectors. For example, a quad segmented photodetector is functionally equivalent to four (4) individual photodetectors arranged in a quad layout.

The device 100 includes a display screen 112 that is configured to at least substantially allow light emitted by the illumination source 110 to pass through the display screen 112. The display screen 112 is also configured to at substantially allow light reflected from an object to pass through the display screen 112 to the photodetector 106. For example, an object (e.g., a hand, a finger, etc.) proximate to the display screen 112 may reflect light generated from the illumination source 110 back through the display screen 112 to the photodetector 106. The photodetector 106 detects the reflected light and provides a signal in response thereto. The display screen 112 includes a first surface 114, which is proximal to the photodetector 106, and a second surface 116, which is distal to the photodetector 106. In an implementation, the display screen 112 may be manufactured from a scratch-resistance material, or the like.

As shown in FIGS. 1 through 4, the photodetector 106 and the illumination source 110 are separated by an optical baffle 118 extending between the substrate 102 and the display screen 112. The optical baffle 118 is configured to prevent optical crosstalk to occur between the illumination source 110 and the photodetector 106. For example, the optical baffle 118 may at least substantially prevent reflected light emitted from the illumination source 110 to reach the photodetector 106. In an embodiment, the optical baffle 118 may be a casted metallic ridge, a molded plastic patrician, a preformed rubber gasket, or the like.

The device 100 includes a lens 120 to focus and transmit light incident thereon (e.g., light incident upon the lens 120 from multiple angles). For example, the lens 120 may be configured to collimate the light incident on the lens 120. In one or more implementations, the lens 120 may be a glass lens, a plastic lens, a spherical lens, an aspherical lens, a Fresnel-type lens, or the like.

Figure 1:
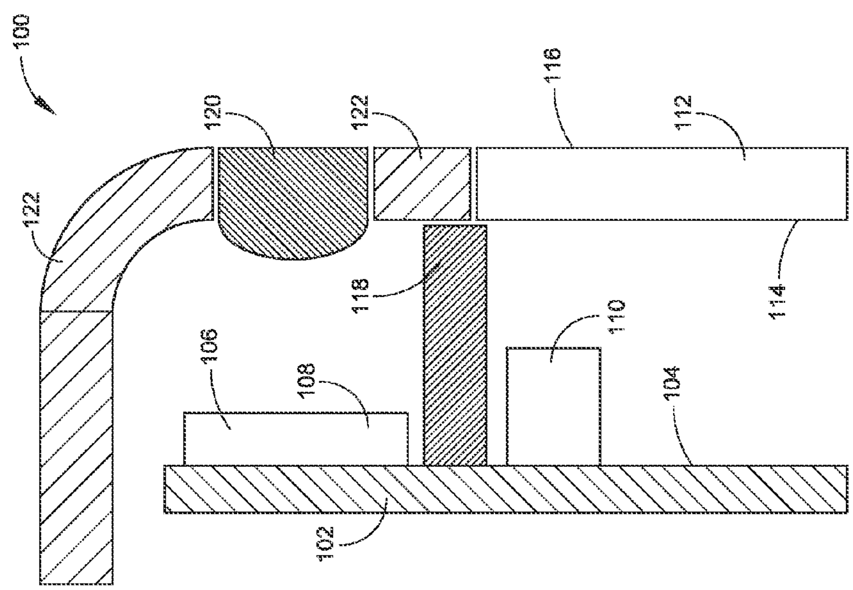
FIG. 1 is a diagrammatic partial cross-sectional side view illustrating a light sensing device having an illumination source, a photodetector, an optical baffle, a display screen, and a lens disposed proximate to the display screen in accordance with an example implementation of the present disclosure, where the lens is disposed within a casing and positioned over the photodetector.

In an implementation, as shown in FIG. 1, the lens 120 may be disposed within a casing 122. The casing 122 may be coupled to the display screen 112 and configured to provide support to the display screen 112 and protection to the components (e.g., substrate 102, photodetector 106, illumination source 110, etc.) of the light sensing device 100. As shown, the lens 120 is enclosed within the casing 122 such that the lens 120 is disposed over the photodetector 106. The casing 122 may be configured in a variety of ways. For example, the casing may be a molding composition, a plastic composition, or the like.

In another implementation, as shown in FIG. 2, the lens 120 is disposed over the first surface 114 of the display screen 112. Thus, light reflected from an object proximate to the device 100 passes through the display screen 112 (the portion of the display screen 112 having the lens 120 disposed thereon) and is then focused by the lens 120, which is then passed to the photodetector 106. The lens 120 may be bonded to the first surface 114 with a suitable adhesive material, such as optical cement, or the like.

Figure 3:
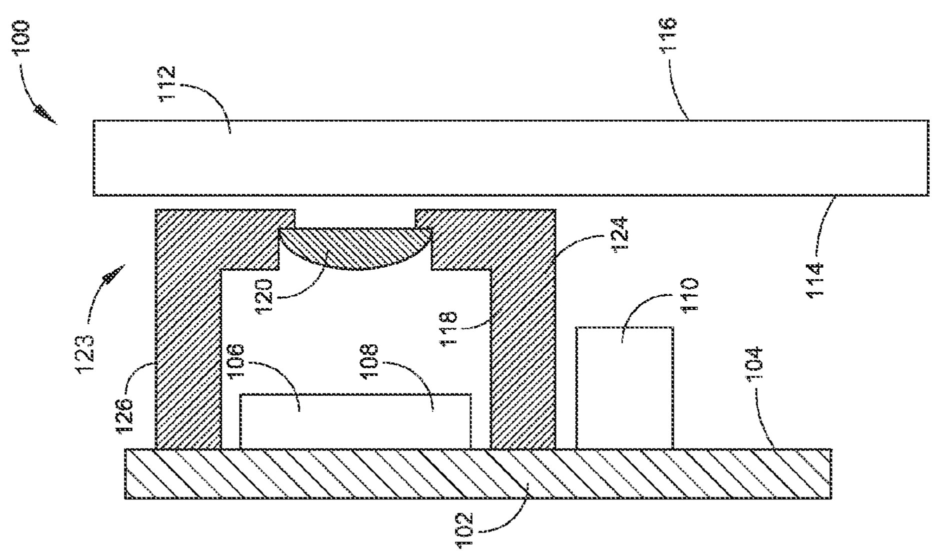
FIG. 3 is a diagrammatic partial cross-sectional view illustrating a light sensing device in accordance with another example implementation of the present disclosure, where the light sensing device includes a lens support structure that is configured to hold the lens in place over the photodetector.

In yet another implementation, as shown in FIG. 3, the lens 120 is disposed within a lens support structure 123 that includes a first support potion 124 and a second support portion 126. The support portions 124, 126 are configured to hold the lens 120 over the photodetector 106. The first support portion 124 of the lens support structure 123 also comprises the optical baffle 118. Thus, the first support portion 124 functions to at least substantially prevent optical crosstalk between the illumination source 110 and the photodetector 106 and functions to at least partially hold the lens 120 in position. As shown, the support portions 124, 126 are coupled to the surface 104 of the substrate 102.

Figure 4:
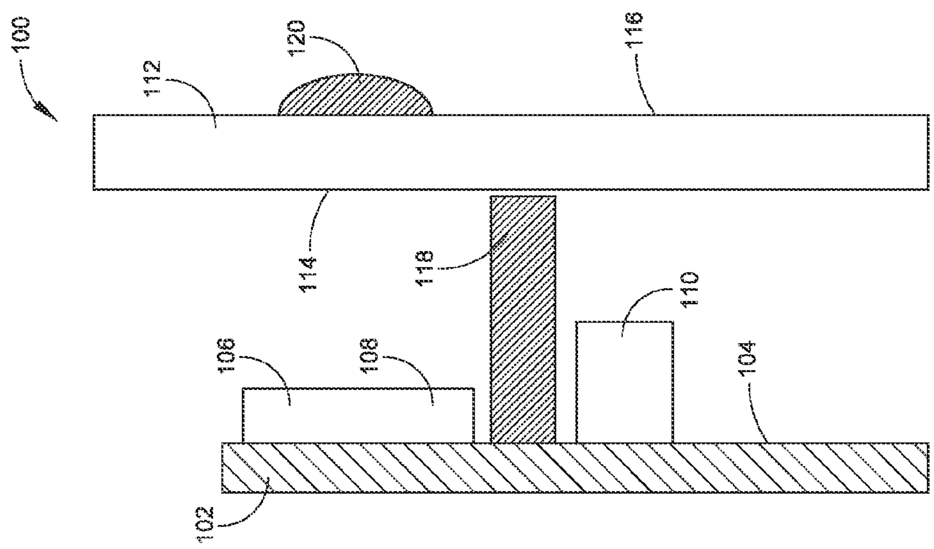
FIG. 4 is a diagrammatic partial cross-sectional view illustrating a light sensing device in accordance with another example implementation of the present disclosure, where the lens is disposed over an exterior surface of the display screen.

In yet another implementation, as shown in FIG. 4, the lens 120 is disposed over the second surface 116 of the display screen 112. In addition to focusing and passing the focused light to the photodetector 106, the lens 120 may also serve to allow users to locate a particular portion of the device 100 that receives gesture motions and subsequently un-lock the devices with certain specific hand or finger gestures without physically touching the display screen. Thus, a user may present a specific finger or hand gesture proximate to the lens 120. The photodetector 106 may detect light reflected from the specific gesture and provide an un-lock signal in response to the detected light (e.g., light reflected in a specific pattern based upon the specific gesture). The un-lock signal may be utilized to unlock an electronic device (e.g., a tablet device, a smart phone, etc.) that the device 100 is incorporated within. Additionally, the user may be able to feel or see where the lens 120 is positioned since the lens 120 extends beyond a plane defined by the first surface 114 of the display screen 112. The lens 120 may also protect the display screen 112 against an abrasive surface, such as a table or desk surface. (e.g., the screen 112 is oriented towards a surface).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A light sensing device comprising:

a substrate having a surface;

a photodetector disposed over the surface of the substrate, the photodetector configured to detect light and to provide a signal in response thereto;

an optical baffle extending from the surface to a display screen, the optical baffle configured to at least substantially prevent transmission of optical crosstalk to the photodetector;

a casing having an exterior surface and an interior surface, the casing at least partially disposed over the substrate and the photodetector, the casing defining a lens receiving aperture, the lens receiving aperture positioned over the photodetector; and a lens having an exterior surface co-planar with the exterior surface of the casing and an interior surface extending beyond a plane defined by the interior surface of the casing, the lens disposed within the lens receiving aperture, the lens configured to focus light incident upon the lens and to pass the focused light to the photodetector.

2. The light sensing device as recited in claim 1, wherein the display screen is a scratch-resistance glass material.

3. The light sensing device as recited in claim 1, wherein the photodetector comprises a quad segmented photodetector.

4. The light sensing device as recited in claim 1, wherein the photodetector is configured to generate an un-lock signal.

5. A light sensing device comprising:

a substrate having a surface;

an illumination source disposed over the surface of the substrate, the illumination source configured to generate light;

a photodetector disposed over the surface of the substrate, the photodetector configured to detect light emitted from the illumination source and to provide a signal in response thereto;

an optical baffle disposed between the illumination source and the photodetector, the optical baffle configured to at least substantially prevent optical crosstalk between the illumination source and the photodetector;

a casing having an exterior surface and an interior surface, the casing at least partially disposed over the substrate and the photodetector, the casing defining a lens receiving aperture, the lens receiving aperture positioned over the photodetector; and a lens having an exterior surface co-planar with the exterior surface of the casing and an interior convex surface extending beyond a plane defined by the interior surface of the casing, the lens disposed within the lens receiving aperture, the lens configured to focus light incident upon the lens and to pass the focused light to the photodetector, wherein the illumination source is disposed adjacent to the optical baffle.

6. The light sensing device as recited in claim 5, wherein the display screen is a scratch-resistance glass material.

7. The light sensing device as recited in claim 5, wherein the photodetector comprises a quad segmented photodetector.

8. The light sensing device as recited in claim 5, wherein the photodetector is configured to generate an un-lock signal.

9. A light sensing device comprising:

a substrate having a surface;

an illumination source disposed directly adjacent to the surface of the substrate, the illumination source configured to generate light;

a photodetector disposed directly adjacent to the surface of the substrate, the photodetector configured to detect light emitted from the illumination source and to provide a signal in response thereto;

a lens configured to be disposed proximate to a display screen, the lens configured to focus light incident upon the lens and to pass the focused light to the photodetector; and a lens support structure disposed between the surface of the substrate and the display screen, the lens support structure including a first support portion and a second support portion, the first and the second support portions configured to hold the lens over the photodetector, the second support portion comprising an optical baffle configured to at least substantially prevent optical crosstalk between the illumination source and the photodetector, wherein the illumination source is disposed immediately adjacent to the second support portion.

10. The light sensing device as recited in claim 9, wherein the display screen is a scratch-resistance glass material.

11. The light sensing device as recited in claim 9, wherein the photodetector comprises a quad segmented photodetector.

12. The light sensing device as recited in claim 9, wherein the photodetector is configured to generate an un-lock signal.

* * * * *